A. C. WEBB.
CLUTCH MECHANISM.
APPLICATION FILED JULY 10, 1911.
1,016,052.
Patented Jan. 30, 1912.
2 SHEETS—SHEET 1.
*Fig. 1.*
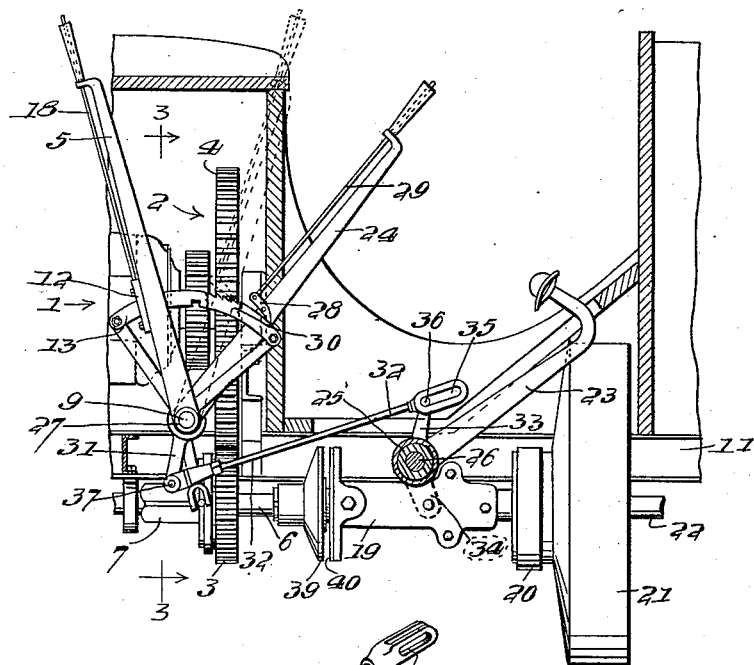
*Fig. 5.*
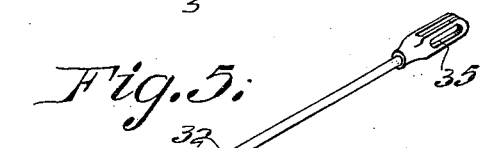
*Fig. 4.*
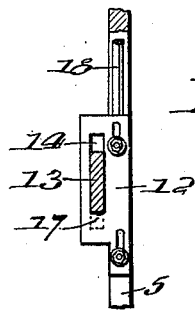
*Fig. 6.*
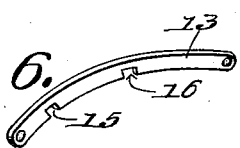
*Fig. 7.*
Witnesses:
Lottie M. Fox.
Bertha von Behrens.
Inventor:
Albert C. Webb,
By Hugh N. Wagner
His Attorney

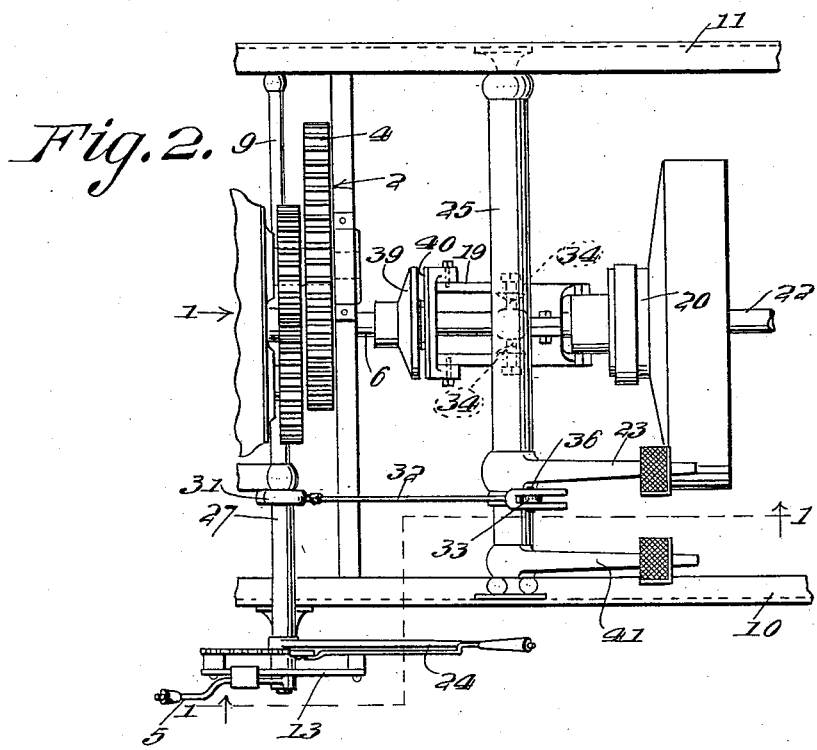
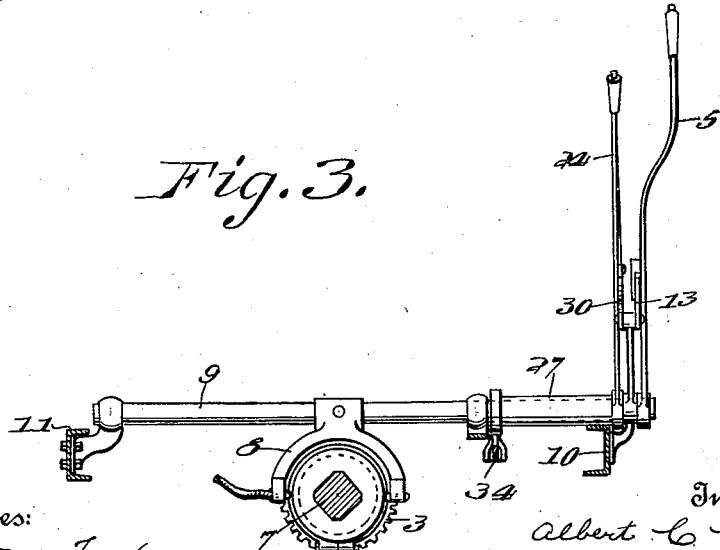

UNITED STATES PATENT OFFICE.

ALBERT C. WEBB, OF ST. LOUIS, MISSOURI, ASSIGNOR TO THE WEBB MOTOR FIRE APPARATUS COMPANY, OF ST. LOUIS, MISSOURI, A CORPORATION OF DELAWARE.

CLUTCH MECHANISM.

1,016,052.     Specification of Letters Patent.     Patented Jan. 30, 1912.

Application filed July 10, 1911. Serial No. 637,743.

*To all whom it may concern:*

Be it known that I, ALBERT C. WEBB, a citizen of the United States, residing at the city of St. Louis, State of Missouri, have invented certain new and useful Improvements in Clutch Mechanism, of which the following is a specification.

The present invention has reference to lever mechanism for controlling the operation of power driven machinery, and more especially for effecting the sliding movements of the clutch-shifting collar of a motor vehicle upon the clutch shaft.

It comprehends primarily, an improved lever system comprising a pair of operating parts which are connected with each other and with the afore-mentioned collar in such a manner to produce the requisite movement of the latter when either of said parts is actuated.

A structural embodiment of the invention is illustrated in the accompanying drawings, whereof:

Figure 1 is a fragmental longitudinal sectional view of an automobile fire engine having said invention applied thereto, the section being taken on the line 1—1 of Fig. 2, Fig. 2 is a plan view of Fig. 1, Fig. 3 is a detail sectional view taken on the line 3—3 of Fig. 1, Fig. 4 is an enlarged fragmental view of the lever for shifting the sliding gear constituting one element of the pump actuating mechanism, Fig. 5 is a detail view of the link which connects the hand and foot clutch-operating levers, and Figs. 6 and 7 are detail views of the racks with which the hand-actuated gear-and-clutch operating levers are respectively associated.

In said drawings, 1 indicates in a general manner the element to be driven or operated, in the present instance, a force pump, which may be of any preferred construction, and 2 the actuating mechanism therefor, such mechanism including a shiftable gear 3 that is moved into and out of mesh with the main drive gear 4 of the pump through the intermediary of a lever 5. Gear 3 is slidably mounted on the clutch shaft 6 of the vehicle, preferably upon the squared portion 7 thereof, as shown in Figs. 1 and 3, and has pivotally connected with its hub a depending yoke 8 which straddles the same, and is itself attached to a horizontal rock shaft 9 journaled in suitable bearings secured to the side rails 10 and 11 of the chassis or frame of the vehicle.

The lever 5, by means whereof shaft 9 is rocked, is affixed to one end of said shaft and is provided with a retaining latch 12 with which there is associated a rack 13 that is supported by the adjacent rail 10 of the vehicle frame, said latch being preferably formed with a slot 14 through which said rack extends. The rack in question is provided upon its lower edge with a pair of spaced notches 15 and 16 with which the shoulder 17 produced by the lower end of the slot is adapted for interchangeable engagement. The movements of the latch are controlled by an operating rod 18 to whose lower end it is fastened.

The arrangement of the notches 15 and 16 upon rack 13 is such that when latch 12 is engaged with the rear notch 15 the shiftable gear 3 will be in mesh with the pump drive gear 4 and will be locked, accordingly, in such engagement; when, however, said lever is thrown forwardly until its latch is engaged with front notch 16, said gear 3 will be shifted bodily out of mesh with gear 4 and will be held in its inoperative position.

Upon the forward portion of the clutch shaft there is disposed a sliding collar 19 for shifting the shipping member 20 of the main clutch, which latter is disposed within the fly-wheel 21 on the engine shaft 22, as is customary, said clutch being of the conventional type and requiring no separate description. To shift said collar, there is preferably provided a pedal or foot lever 23, and also, a hand lever 24, either of which levers may be actuated to effect the movement of said collar. Lever 23 is provided with a controlling spring of the usual type, (not shown), and is securely mounted on a sleeve 25 which, in turn, is loosely fitted on a horizontal rock shaft 26 arranged parallel with and in advance of shaft 9. The hand lever 24 is secured to a sleeve 27 loosely mounted on shaft 9 and is equipped with a pawl 28 operated by rod 29 and adapted to engage the teeth of a rack 30 which is located adjacent rack 13 and is carried by the same bracket as that rack. To this sleeve there is also secured a depending arm 31 that is connected by a link 32 with an upstanding arm 33 fast on sleeve 25, the latter element being provided with a pair of depending arms 34 secured to the adjacent side members of collar 19. The opposite ends of link 32 are forked, and the two legs of the front fork are formed with alining slots 35 which receive the ends of a cross-pin 36 carried by arm 33 at its upper end, the lower end of arm 31 carrying a similar pin 37 whose ends are engaged in perforations 38 in the legs of the rear fork of said link.

The parts of the main clutch are normally held in engagement with each other, as is customary, by means of the controlling spring associated with the foot lever 23, which latter must, accordingly, be depressed in order to separate said parts. When thus actuated, sleeve 25 will be rocked, and the arms 34 secured thereto will be swung rearwardly and will shift collar 19 in the same direction on the clutch shaft, with a consequent disengagement of the clutch parts; at the same time, the upper arm 33 will be swung forwardly, but will occasion no movement of link 32 since its pin 36 will merely travel idly in slots 35. When the hand lever 24 is operated to shift collar 19, it is swung rearwardly into the dotted line position shown in Fig. 1, whereupon sleeve 27 will be rocked and arm 31 will swing forwardly and will produce a corresponding endwise movement of link 32 with the result that arm 33 will be rocked, as above described.

Means is provided for terminating or braking the rotary movement of the clutch shaft 6 when the clutch parts are separated, and such means consists, in the present construction, of a pair of coöperating friction disks 39 and 40, of which the latter is secured to the rear end of collar 19 and the former to shaft 6, as shown in Figs. 1 and 2. The arrangement is such, therefore, that said disks will be caused to engage each other during the rearward movement of the clutch collar.

In addition to the parts above specified, the car is equipped with the usual brake lever 41 which is secured to shaft 26 and is operated in the usual manner by foot pressure.

With reference to the completed operation of the mechanism shown, it may be stated that when it is desired to start the pump, assuming that the car is stationary and that the engine is running idly, the lever 5 is moved into the position shown in Fig. 1 and its latch engaged in the rear notch 15 in rack 13, such movement shifting gear 3 on the clutch shaft into mesh with the driving gear 4. Lever 24, which has previously been moved rearwardly into its dotted line position to uncouple the clutch members, is then released or unlocked from its engagement with rack 30 and moved into its full line position, thereby coupling the clutch members and causing the crank shaft to rotate with the engine shaft. The pump may subsequently be stopped by either returning lever 24 to its dotted line position or depressing the foot lever 23 as already described, the rearward movement of the clutch collar bringing its friction disk 40 into engagement with disk 39 and terminating the rotation of the crank shaft. The shiftable gear 3 may then be moved out of mesh with gear 4 by operating lever 5 in the manner hereinabove stated.

What is claimed is:

1. The combination, with a driving part, a driven part, and a clutch connecting said parts and including a movable shipping member; of a member slidable on the driven part and connected to said shipping member for operating the same; a foot lever; means connecting the foot lever with said sliding member; a hand lever; and a link pivotally connected at one end with said hand lever and having a pin-and-slot connection at its other end with said foot lever, whereby said sliding member may be operated from either of said levers.

2. The combination, with a driving part, a driven part, and a clutch connecting said parts and including a movable shipping member; of a member slidable on the driven part and connected to said shipping member for operating the same; a foot lever, means connecting the foot lever with said sliding member; a hand lever; and a link pivotally connected at one end with said hand lever and having a lost-motion connection at its other end with said foot lever, whereby said sliding member may be operated from either of said levers.

In testimony whereof I hereunto affix my signature in the presence of two witnesses.

ALBERT C. WEBB.

Witnesses:
R. M. JAMES,
LOTTIE M. FOX.